Sept. 29, 1925.                      1,555,610
A. W. REYNOLDS
WEEDER TOOTH ATTACHING MEANS
Filed Dec. 22, 1923
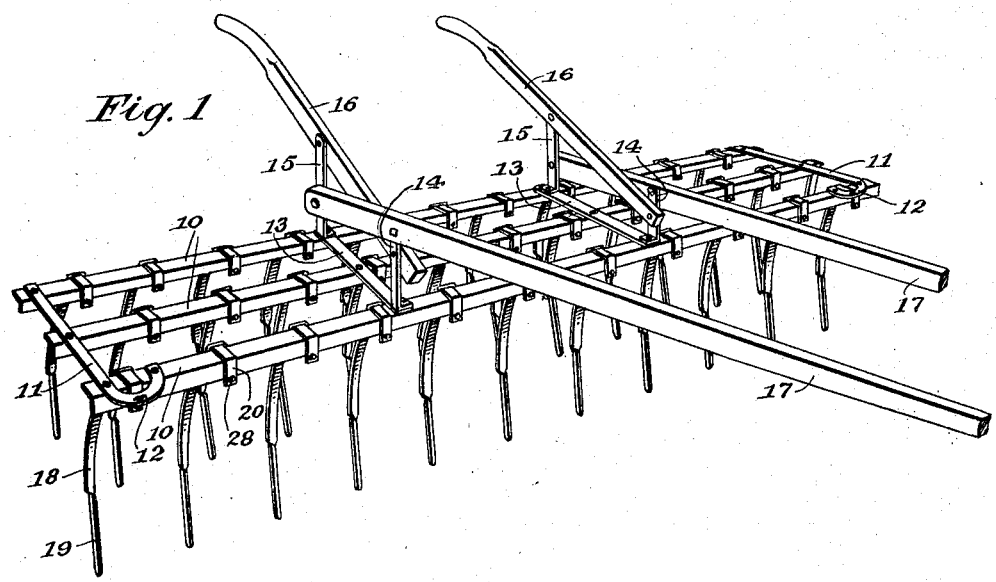
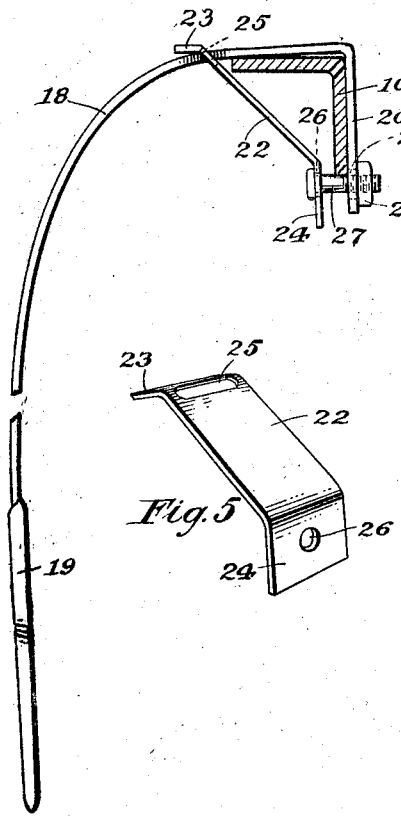
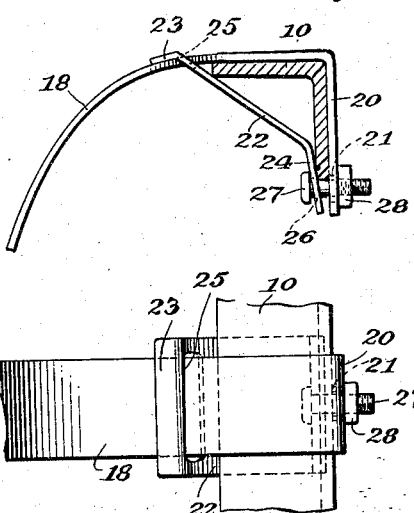
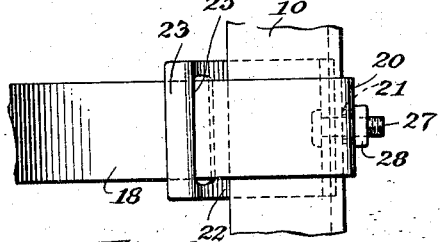
Inventor
Arthur W. Reynolds
By Chamberlain & Newman
Attorneys Patented Sept. 29, 1925.

1,555,610

UNITED STATES PATENT OFFICE.

ARTHUR W. REYNOLDS, OF NEWTOWN, CONNECTICUT.

WEEDER-TOOTH-ATTACHING MEANS.

Application filed December 22, 1923. Serial No. 682,183.

*To all whom it may concern:*

Be it known that ARTHUR W. REYNOLDS, a citizen of the United States, and resident of Newtown, in the county of Fairfield and State of Connecticut, has invented certain new and useful Improvements in Weeder-Tooth-Attaching Means, of which the following is a specification.

This invention relates to improved tooth attaching means for weeders, or the like, and has for an object to provide such means which will hold the teeth in a reliable and firm manner, so that they cannot become loose or get out of alignment, as is the case with the usual attaching means employing drilled holes in the angle bars.

A further object is to provide attaching means which will permit the teeth to be positioned at any desired points longitudinally of the angle bars of the weeder, so that they may be spaced close or far apart, and in staggered, aligned, V-shape, or other arrangement upon the several bars, thereby adapting the weeder to various kinds of work, as for instance, ordinary rough weeding, or weeding tender plants in rows, the arrangement permitting the latter work to be carried out without tearing the leaves or injuring the plants in any way.

A still further object is to provide attaching means which will be self-locking in the nature of a lock-nut, so that loosening from vibration will be prevented. Other objects are simplicity of construction, and facility of attachment and adjustment of the teeth.

With the above and other objects in view an embodiment of the invention is shown in the accompanying drawings, and this embodiment will be hereinafter more fully described, with reference thereto, and the invention will be finally pointed out in the claims.

In the drawings:

Fig. 1 is a perspective view of a one-horse walking weeder, provided with tooth attaching means according to the invention;

Fig. 2 is a side view of the tooth and attaching means, the same being in loose relation on the angle bar;

Fig. 3 is a similar view, the parts being in tightened or operative position;

Fig. 4 is a plan view of the tooth and attaching means upon the angle bar; and

Fig. 5 is a perspective view of the attaching plate forming part of the attaching means.

Similar reference characters indicate corresponding parts throughout the several figures of the drawings.

Referring to the drawings, the invention is adapted for use upon weeders, cultivators, harrows, or the like, either of the riding type, in which the driver rides upon the machine, as shown for instance in my pending application Ser. No. 610,165, or of the walking type, as shown herein, in which the driver walks behind the machine. This latter type of weeder, as illustrated, comprises a plurality, three as shown, of angle bars 10 arranged in spaced parallel relation and connected rigidly near their ends by transverse braces 11, hooked at their forward ends, as at 12, and secured at two spaced points to the forward angle bar, and also connected intermediately by spaced transverse bars 13. These bars 13 are provided with upstanding supports 14 and 15 at each end, to which the handles 16 and shafts 17 are secured in the usual manner.

The weeder teeth 18 are secured in depending relation to the angle bars 10, and according to the present invention may be longitudinally adjusted to any desired points thereon, so that various arrangements may be employed, to suit the particular type of work being done, the illustration showing the same staggered.

The teeth 18 are formed of flat spring metal, curved rearwardly and downwardly, and provided with rigid integral ground engaging points 19, the upper forward end of the teeth being bent downwardly at a right angle, as at 20, this angular portion adapted to engage over the angle bar 10, as shown in Figs. 2 and 3, with the lower end of the portion 20 extending below the lower edge of said bar, and being provided with an aperture 21.

The attaching means comprise a sheet metal plate 22, bent at an obtuse angle at its upper end, as at 23, and at an obtuse angle at its lower end, as at 24, the latter portion being longer than said portion 23. A slot 25 is provided in the plate adjacent the upper angular portion 23, while the lower portion 24 is provided with a bolt receiving aperture 26 adapted to align with the aperture 21 of the tooth. The plate is engaged upon the tooth by inserting the end 20 through the slot 25, and is disposed at the inner or rear side of the angle bar.

A bolt 27 is thereupon passed forwardly through the apertures 26 and 21 of the plate and tooth, respectively, the bolt head engaging the plate at the rear side, while a nut 28 is screwed upon the threaded end of the bolt and bears upon the surface of the portion 20 of the tooth. It will be noted that in the loose position, (Fig. 2.) the end 23 of the plate is at an angle to the tooth surface, while the end 24 hangs in a substantially vertical plane. In the tightened position, (Fig. 3) the end 23 is drawn down tightly upon the tooth surface, the intermediate portion adjacent the portion 23 bears tightly against the inner edge of the angle bar, and the end 24 is pressed forwardly to an inclined position adjacent the angle bar surface, so that the upper portion of the tooth is held down tightly upon the upper surface of the angle bar, while the portion 20 is drawn inwardly into tight relation with the vertical forward surface of the bar, thereby securely attaching the tooth and retaining it against angular displacement. The plate 22 is slightly resilient, so that upon tightening of the bolt it is tensioned through the pressure of the bolt, the upper end of the plate being rigidly supported by the engagement of its end 23 with the tooth and the engagement of the upper surface of the plate adjacent the portion 23 with the rear edge of the angle bar, the tooth acting as an anchor, while the bar serves as a fulcrum. In this manner the bolt and nut are effectually locked against accidental turning or displacement.

It is obvious that the teeth may be shifted to any desired position longitudinally of the angle bar to provide the proper arrangement for the work to be done, and in their tightened relation are securely held against any possibility of accidental shifting or displacement.

I have illustrated and described a preferred and satisfactory embodiment of the invention, but it is obvious that changes may be made therein within the spirit and scope thereof, as defined in the appended claims.

Having thus described my invention, what I claim and desire to secure by Letters Patent is:

1. A fastening device for the teeth of weeders or the like, having a tooth supporting bar, said teeth having a hook portion at one end engaged over said bar, comprising slightly resilient clamping means engaged upon the tooth extending between spaced points of said tooth substantially diagonally of said bar, and means for securing said clamping means in clamping relation, said teeth being adjustable longitudinally of the bar.

2. A fastening device for the teeth of weeders or the like having a tooth supporting bar, said teeth having a portion disposed at one side of the bar, comprising a resilient clamping means engaged upon the tooth and disposed at the other side of the bar from said tooth portion, and means connecting said clamping means and said tooth portion for securing the tooth to the bar.

3. A fastening device for the teeth of weeders or the like having a tooth supporting bar, comprising clamping means engaged upon the tooth, and means for securing said clamping means to the bar, said clamping means adapted to be tensioned by said last named means to exert frictional pressure on said means.

4. A fastening device for the teeth of weeders or the like having a tooth supporting bar, said teeth having a portion disposed at one side of the bar, comprising a plate engaged upon the tooth and disposed at the other side of the bar from said tooth portion, and means connecting said plate and said tooth portion to clamp the tooth upon the bar, said last named means adapted to tension said plate whereby said plate is adapted to exert frictional pressure on said means.

5. A fastening device for the teeth of weeders or the like having a tooth supporting bar, said teeth having a portion disposed at one side of the bar, comprising a plate having a slot, said plate being engaged upon the tooth by insertion of the latter in said slot and being disposed at the other side of said bar from said tooth portion, and means connecting said plate and tooth portion to clamp the tooth upon the bar.

6. A fastening device for the teeth of weeders or the like having a tooth supporting bar, said teeth engaging said bar at the upper side and having an angularly bent portion engaging the bar at one side, comprising a plate engaged upon the tooth and disposed at the other side of the bar from said angularly bent portion, and means at the under side of the bar connecting said plate and said angularly bent portion of the tooth to clamp the tooth upon the bar.

7. A fastening device for the teeth of weeders or the like having a tooth supporting bar, said teeth having a portion disposed at one side of the bar, comprising a plate having a slot near one end, said plate being engaged upon the tooth by insertion of the latter in said slot and being disposed at the other side of said bar from said tooth portion, means on said plate adapted to limit the free movement of said plate toward said tooth portion, and tightening means connecting said plate and tooth portion and adapted to tension said plate.

8. In a weeder or the like, a tooth supporting bar, a tooth engaged upon said bar, and having a portion disposed at one side of the bar, a clamping plate engaged upon the tooth and disposed at the other side of the bar, and adjustable means connecting said clamping plate and said tooth portion to clamp the tooth upon the bar by tensioning the clamping plate.

Signed at Bridgeport in the county of Fairfield and State of Connecticut this 21st day of December A. D., 1923.

ARTHUR W. REYNOLDS.